United States Patent [19]
Koksbang et al.

[11] Patent Number: 5,753,388
[45] Date of Patent: *May 19, 1998

[54] PROCESS FOR PRELITHIATION OF CARBON BASED ANODES FOR LITHIUM ION ELECTROCHEMICAL CELLS

[75] Inventors: Rene Koksbang, Odense, Denmark; Ib I. Olsen, Cockeysville, Md.; Jeremy Barker, Henderson, Nev.

[73] Assignee: Valence Technology, Inc., Henderson, Nev.

[*] Notice: The term of this patent shall not extend beyond the expiration date of Pat. No. 5,595,837.

[21] Appl. No.: 761,576

[22] Filed: Dec. 9, 1996

Related U.S. Application Data

[63] Continuation-in-part of Ser. No. 422,185, Apr. 12, 1995, Pat. No. 5,595,837.
[51] Int. Cl.$^6$ ............................................ H01M 10/40
[52] U.S. Cl. ........................ 429/194; 29/623.1; 429/218
[58] Field of Search .......................... 429/194, 218, 429/224; 29/623.1, 623.5; 423/179.5, 460; 205/59

[56] References Cited

U.S. PATENT DOCUMENTS

| | | | |
|---|---|---|---|
| 5,028,500 | 7/1991 | Fong et al. | 429/194 |
| 5,162,176 | 11/1992 | Herr et al. | 429/194 |
| 5,436,093 | 7/1995 | Huang et al. | 429/218 X |

OTHER PUBLICATIONS

Desilvestro, J., et al., "Metal Oxide Cathode Materials for Electrochemical Energy Storage: A Review", *Electrochem. Soc.*, vol. 137, No. 1, pp. 5C–22C (1990) No month.

Dudley, J.T., et al., "Conductivity of electrolytes for rechargeable lithium batteries", *Journal of Power Sources*, 35:59–82 (1991) No month.

*Primary Examiner*—Anthony Skapars
*Attorney, Agent, or Firm*—Charles Jew

[57] ABSTRACT

A method of increasing the amount of alkali metal that is available during charge/discharge of an electrochemical cell that employs carbon based intercalation anodes is provided. The method comprises of prealkaliation of the carbon anode. By subjecting the anode carbon to the prealkaliation process prior to packaging the electrochemical cell, substantially all the alkali metal (e.g., lithium) which is originally present in the cathode will be available for migration between the anode and cathode during charge/discharge.

32 Claims, 1 Drawing Sheet

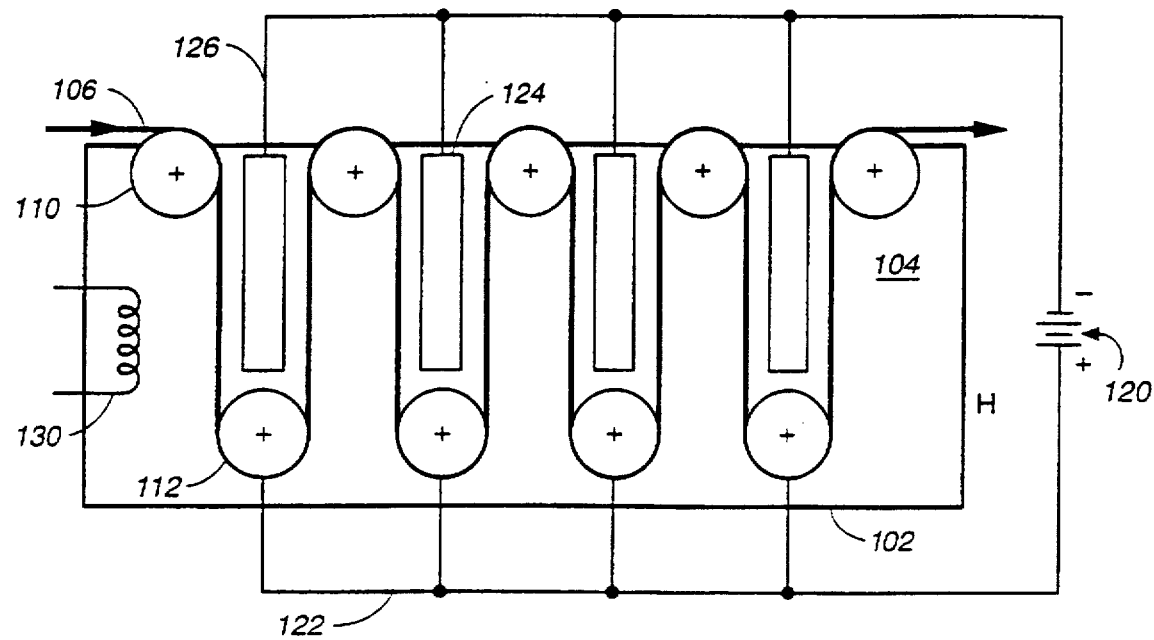
FIG._1

PROCESS FOR PRELITHIATION OF CARBON BASED ANODES FOR LITHIUM ION ELECTROCHEMICAL CELLS

This is a continuation-in-part of application Ser. No. 08/422,185 filed on Apr. 12, 1995, now U.S. Pat. No. 5,595,837.

FIELD OF THE INVENTION

The present invention relates to electrochemical devices and, more particularly, to a method of fabricating carbon anodes for non-aqueous electrochemical cells.

BACKGROUND OF THE INVENTION

Non-aqueous lithium electrochemical cells typically include an anode of metallic lithium, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active material through the electrolyte and are plated back onto the lithium anode.

During each discharge/charge cycle small amounts of lithium and electrolyte are consumed by chemical reactions at newly created surfaces. As lithium inherently tends to form high surface area peaks or dendrites as it is plated back onto the anode, this reactive condition is aggravated. Furthermore, the dendritic peaks continue to grow until they eventually contact the cathode which causes the cell to fail. Additional amounts of lithium do not cohesively plate onto the anode during the charge cycle and result in the formation of spongy deposits near the anode surface. As these deposits are not in electrically conductive contact with the anode, they eventually detract from the capacity of the cell.

One approach to this problem has been to replace the lithium metal anode with a carbon anode such as coke or graphite intercalated with lithium metal to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode cannot occur even under abuse conditions. Also, because lithium is reincorporated into the anode by intercalation rather than by plating, dendritic and spongy lithium growth cannot occur.

The use of carbon anodes however is not without problems. As $Li_xC$ is a reactive material which is difficult to handle in air, it is preferably produced in-situ in a cell. In doing so, some of the lithium and carbon are consumed in an irreversible process. This irreversible process results in an initial capacity loss for the cell which reduces the cell's overall performance. The percentage of initial or first capacity loss is defined as:

$$\frac{(\text{first cycle charge capacity} - \text{first cycle discharge capacity}) \times 100}{\text{first cycle charge capacity}}$$

Furthermore, the cell often exhibits a progressive loss of capacity over numerous charge/discharge cycles. This progressive loss is commonly referred to as "capacity fade."

In view of the above shortcomings associated with the prior art, there is a need for solid state electrochemical devices that are capable of providing improved cycle life, capacity, and rate capability.

SUMMARY OF THE INVENTION

The present invention relates to a method of increasing the amount of lithium that is available during charge/discharge of an electrochemical cell that employs intercalation based carbon anodes. The inventive process can be implemented on a continuous or batch basis.

In one aspect, the invention is directed to a method for fabricating an electrochemical cell which includes the steps of:

(a) preparing a carbon anode in a process comprising of:
  (i) providing a carbon material that is capable of intercalating lithium metal; and
  (ii) prelithiating the carbon material with lithium metal;
(b) providing a cathode including cathodic material comprising a non-lithiated compound; and
(c) forming a solvent-containing electrolyte that is interposed between said anode and said cathode.

In a preferred embodiment, the prelithiation step comprises short circuiting the carbon material to a lithium counter electrode. In another embodiment, prelithiation occurs at an elevated temperature.

The invention is also directed to electrochemical cells fabricated by the inventive process. In one preferred embodiment, the cathodic material consists essentially of a non-lithiated compound and/or the solvent-containing electrolyte comprises a polymeric matrix.

BRIEF DESCRIPTION OF THE DRAWINGS

FIG. 1 is a schematic side view of an illustrative galvanic cell device for prelithiating an intercalation based carbon anode.

DETAILED DESCRIPTION OF THE PREFERRED EMBODIMENTS OF THE INVENTION

The present invention is directed to a method of fabricating a rechargeable electrochemical device, particularly an electrochemical cell and battery, that includes: a cathode, an intercalation based carbon anode, with each electrode capable of reversibly incorporating (i.e., intercalating) an alkali metal, alkali metal incorporated in at least one the electrodes, and a solid electrolyte comprising an organic solvent and a salt of the alkali metal. Particularly preferred electrochemical cells and batteries use lithium metal and salts thereof. An important aspect of the invention is that the carbon material of the anode is prelithiated prior to packaging thereby increasing the amount of lithium that is available during charge/discharge of the electrochemical cell or battery. A feature of the invention is that non-lithium containing cathode active materials can be employed in conjunction with the carbon anodes.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability liquid solvents (e.g., diethyl ether) or by supercritical fluids for example. Preferred plasticizers include, for example, dibutyl phthalate, dioctylphthalate, and acetates, glymes, and low molecular weight polymers.

In operation, for fabricating a solid polymeric matrix and composite electrode that includes polymeric binders, for example, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and solid polymeric matrix. The anode and/or cathode may each include a current collector. For a liquid electrolytic cell, a separator made of any suitable material such as, for example, glass fiber, polyethylene, or polypropylene is employed instead of a solid polymeric matrix.

The term "activation" refers to the placement of an electrolyte solution into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. The solid polymeric matrix is preferably an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein.

The term "a solid matrix forming monomer" refers to inorganic or organic materials which in monomeric form can be polymerized, preferably in the presence of an inorganic ion salt, and a solvent to form solid matrices which are suitable for use as solid electrolytes in electrolytic cells. Suitable solid matrix forming monomers are well known in the art and the particular monomer employed is not critical.

The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283 which is incorporated herein), urethane acrylate, vinyl sulfonate polyalkylene oxides (as disclosed in U.S. Pat. No. 5,262,253, which is incorporated herein), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product may contain repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluoride and hexafluoropropylene dissolved in acetone or other suitable solvent(s). Upon casting the solution, the solvent is evaporated to form the solid polymeric matrix.

The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic electrolyte ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K. Lithium salts are most preferred.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. Solvents are described in U.S. Pat. Nos. 4,115,206, 4,384,115, 4,423,205, and 4,747,850, which are incorporated herein.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100 k, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. A preferred coke is available as Mitsubishi Gas Carbon™ from Mitsubishi Gas Co., Japan. Such carbon intercalation based anodes typically include a polymeric binder suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black. With the present invention, the intercalation based anode comprising carbon material that have undergone prelithiation as described below is particularly preferred.

When employing intercalation based carbon anodes, it is known that a portion of the carbon material will react irreversibly with the alkali metal (e.g., lithium) and other components (e.g., electrolyte) when the electrochemical cell is initially charged after the cell has been packaged. The percentage of the carbon material undergoing this reaction depends on the source of carbon (e.g., coke) and this percentage can range from about 10% to about 50%, or more. Other factors influencing this percentage include the particular alkali metal, the electrolyte solvents and salts employed and the charging and discharging current and voltages. For Mitsubishi Gas Carbon™ approximately 30% to 40% of the carbon will react irreversibly with lithium.

After the initial charge, subsequent recharges (following each discharge of the cell) do not result in further appreciable loss of lithium. The exact nature of the reaction is not known but results in the loss of a useable amount of lithium. As is apparent, a significant portion of the original lithium present in the cathode, for instance, is sacrificed upon charging the electrochemical cell thereby reducing the cell's energy density and capacity. With the inventive prelithiation process, carbon material to be used in the anode is subject to this irreversible reaction with the lithium available from an external source. In the case of electrochemical cells employing lithium, for instance, the carbon material is reacted with lithium before the anode, cathode, and solid electrolyte are incorporated to form the cell. Thus, when this prelithiated anode is employed, practically all the lithium initially in the cathode (e.g. in the form of $LiMn_2O_4$) becomes available not only for the initial charging but also subsequent discharges/charges as well.

The term "prealkaliation" refers to a process whereby the carbon anode material is exposed to alkali metal or ions under conditions that would cause a portion of the carbon to undergo the above described irreversible reaction with the alkali metal. During the prealkaliation process a portion of the alkali metal will be intercalated in the carbon anode. Intercalated alkali metal can be readily removed whereas metal having undergone the irreversible reaction cannot be. For example, some or essentially all the intercalated metal can be removed from the carbon anode following the prealkaliation process prior to packaging into an electrochemical cell. The process can be implemented on a batch, continuous or semi-continuous basis. Prealkaliation is conducted prior to packaging the electrochemical device and particularly prior to the initial charge/discharge of an electrochemical cell or battery. One prealkaliation method that is described further below involves polarizing a carbon anode in a galvanic cell. Conceptually, any technique that can simulate the charging of an carbon anode can be employed. Another method described herein is to simply short circuit a carbon anode and a lithium counter electrode. A less preferred prealkaliation method is to expose the carbon material to a solution containing a highly reactive alkali salt. For example, a solution of lithium and benzophenone or lithium and naphthalene may be sufficiently reactive to react reversibly and irreversibly with the carbon due to the presence of the electron acceptors. Most preferably, prealkaliation produces a carbon anode, which prior to packaging into an electrochemical cell, already has substantially the same percentage of carbon irreversibly bonded to alkali metal (e.g., lithium) that prior art anodes had after the initial charge following packaging.

The cathode typically comprises a cathodic material or cathode active material (i.e., insertion compound) which is any material which functions as a positive pole in a solid electrolytic cell. Such cathodic materials are well known in the art and include, by way of example, transition metal oxides, sulfides, and selenides, including lithiated compounds thereof. Representative cathodic materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$ and mixtures thereof. Preferred non-lithium containing cathode active materials include, for example, $\beta V_2O_5$, $MO_2$, $MoS_2$, $FeOCl$, $MoO_3$, $V_6O_{13}$, $TiS_2$, $V_2O_5$, $TiO_2$, and mixtures thereof which are described in Desilvestrio and Haas "Metal Oxide Cathode Materials for Electrochemical Energy Storage: A Review", *J. of Electrochemical Soc.*, Vol. 137, No. 1., pp. 5C–22C (1990), which is incorporated herein.

Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq 2$. Blends can also include $Li_y$-$\alpha$-$MnO_2$ ($0\leq y<1$) which has a hollandite-type structure. $Li_y$-$\alpha$-$MnO_2$ where $0\leq y<0.5$ is preferred. $\alpha MnO_2$ can be synthesized by precipitation from a reaction between a $MnSO_4$ solution and $(NH_4)_2S_2O_8$ as an oxidizing agent.

Lithiation of $\alpha MnO_2$ can be accomplished via a solid state reaction:

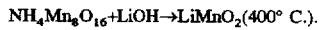
$$NH_4Mn_8O_{16}+LiOH \rightarrow LiMnO_2 (400° C.).$$

Li-$\alpha$-$MnO_2$ retains the same structure as Hollandite. See, Botkovitz et al., J. of Power Sources, 43–44 (1993) 657–665, which is incorporated herein, for a discussion of the structure and electrochemical characteristics of Li-$\alpha$-$MnO_2$. $Li_y$-$\alpha$-$MnO_2$ $0\leq y<0.5$ is commercially available from SEDEMA, Tertre, Belgium.

In one preferred embodiment, the cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1 k to 5,000 k.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, copolymers of PVDF and HFP, and the like; from about 0 to about 20 weight percent of polyethylene oxide having a number average molecular weight of at least 100,000; from about 10 to 50 weight percent of electrolyte solvent; and from about 5 weight percent to about 25 weight of a solid matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100 k. Preferably, the film forming agent is employed in an amount of about 1 to about 10 weight percent and more preferably at about 2.5 weight percent based on the total weight of the electrolyte composition.

Methodology

An illustrative prealkaliation, e.g., prelithiation, technique employs a galvanic cell shown schematically in FIG. 1 which comprises a reactor enclosure 102 containing a lithium salt liquid electrolyte 104. The electrolyte is heated or cooled by conventional means represented by heating/cooling coil 130. Web 106 which comprises a laminate of carbon anode material coated on an electrically conductive substrate is fed through the electrolyte bath 104 using rollers 110 and electrically conducting rollers 112. Rollers 112 are in electrical contact with power supply 120 through wires 122. The carbon anode of the web and the counter electrode 124 are in ionic contact through the electrolyte and are in electrical contact through the electrically conducting rollers 112, wires 122, the power supply 120, and wires 126. In one embodiment, the substrate of the web can be the current collector for the anode.

The speed at which the web is fed through the electrolyte is determined primarily by the amount of carbon per unit area, the type of salt (e.g., lithium) and electrolyte (e.g. propylene carbonate, ethylene carbonate, and other suitable organic solvents), the applied current or potential and the temperature of the electrolyte. Selection and optimization of the operating parameters for a particular speed can be achieved by a person skilled in the art. As is apparent, the speed should be slow enough so that the residence time of the web in the electrolyte is sufficient to allow the irreversible reactions to come to completion.

The power supply will either be maintained at a constant potential between the web (i.e., carbon anode) and the counter electrode (e.g., lithium) by adjusting the current (potentiostatic mode), or it will be maintained at a constant current that is sufficient to fully discharge the carbon anode during the residence time in the reactor (galvanostatic mode). The constant potential in the potentiostatic mode and the current in the galvanostatic mode will also depend primarily on the amount of carbon per unit area, the type of carbon, the type of electrolyte, and the temperature.

In the case of prelithiation, the counter electrode reaction will be:

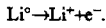
$$Li° \rightarrow Li^+ + e^-.$$

The carbon electrode reaction undergoes two types of reactions: (1) the reversible (i.e., intercalation) electrode reaction utilized in the cell or battery: $Li^+ + e^- + C_6 \rightarrow Li_xC_6$ and (2) the irreversible reaction with carbon surface impurities, electrolyte impurities, and carbon catalyzed electrolyte decomposition, which yields a combination of lithium covalently bonded to the carbon surface and ionically bonded in solid ionic conducting surface layers, as well as solid, liquid, and gaseous byproducts. The nature of the irreversible reactions will depend on the type of carbon, the type of electrolyte, and the temperature. The final prelithiated coating may be reactive towards oxygen and moisture and therefore should be kept in an inert atmosphere (e.g., argon or nitrogen) until assembled into an electrochemical device.

To reduce the reactivity of the prelithiated coating, it can be processed through a second galvanic bath with the same components as the first bath, but applying the current in the reverse direction. This causes some or substantially all the intercalated lithium to be removed from the carbon material. Thus, effectively only alkali that has irreversibly reacted with the carbon material remains.

Another prealkaliation method comprises short circuiting the anode coating and the lithium counter electrode, for example, by connecting them with a low impedance contact such as a copper wire. The advantage of this method is that since the potential of the anode does not fall below 0 V relative to lithium, metallic lithium does not plate onto the anode surface. The disadvantage is that there is less control of the exact amount of lithium used for the prealkalation.

Employing this procedure, an anode comprising Mitsubishi Gas Carbon was prelithiated. The prelithiation electrolyte was a 1 molar electrolyte solution of $LiPF_6$ in ethylene carbonate/dipropylene carbonate (Grant Ferro Chemical, Baton Rouge, La.)/dipropylene methyl acetate (Arco Solv, Newton Square, Pa.) 8/2/5 wt/wt/wt. The carbon anode was incorporated into an electrochemical cell employing this electrolyte and metallic lithium as the counter electrode. The cell was then equilibrated at various temperatures and subsequently short circuited for different lengths of time. Any means of electrically connecting, i.e., short circuiting, the carbon anode material to the counter electrode can be employed. Electrochemical cells were then manufactured using the prelithiated carbon anodes in the Example described in detail hereinbelow. The cells were tested to determine the first cycle capacity loss. The procedure for this test was to first fully charge each cell after being assembled and then discharge each cell and measure the capacity loss. The data is set forth in the following table. The charge current was 0.2 $mA/cm^2$ and the discharge current was 0.2 $mA/cm^2$. The voltage limits were 4.1 and 2.5 volts.

As is apparent from the data, the longer the prelithiation time employed, the smaller the capacity loss experienced by the electrochemical cell. The data suggest that a sufficient amount of time is required to permit the irreversible reaction that occurs between some of the carbon of the anode and lithium to come to completion. The data also suggests that rate of the prealkaliation reaction can be increased by raising the operating temperature. As a comparison, electrochemcial cells fabricated with carbon anodes that did not undergo prelithiation had first cycle capacity losses of 35% to 40%.

| | CAPACITY LOSS (Prelithiation time) | | | | | | | |
|---|---|---|---|---|---|---|---|---|
| Temp. | 5 secs | 15 secs | 30 secs | 1 min | 2.5 min | 5 min | 10 min | 15 min |
| 23° C. | 40 ± 1 | 35 ± 1 | — | 31 ± 1 | — | 15 ± 1 | — | 10.5 ± 2.5 |
| 50° C. | 39 ± 1 | 37 ± 1 | 41 ± 1 | 33 ± 1 | 24 ± 10 | 15 ± 6 | 12 ± 0.5 | 12 ± 4 |
| 75° C. | 38 ± 1 | 33 ± 1 | 30 ± 1 | 23 ± 1 | 15 ± 2 | 14 ± 2 | 10 ± 2 | 12 ± 1 |
| 100° C. | 26 ± 3 | 13 ± 2 | 12 ± 2 | 7.7 ± 1 | 8.7 ± 1 | 0 | 0 | 0 |

Generally, the prealkaliation (e.g., prelithiation) conditions employed will vary depending, for instance, on the carbon anode material and alkali metal. Preferably the selected process conditions of the prealkaliation step are such that following treatment the carbon material produced has the same amount of irreversibly loss alkali metal (e.g., percentage of lithium that reacts irreversibly with the carbon) that an untreated carbon material would have in the electrochemical device. In other words, the prealkaliation process conditions will also depend on the particular electrochemical device. A person skilled in the art with the benefit of this disclosure can readily determine (and optimize) the process conditions needed to produce a treated carbon having a predetermined amount of irreversibly reacted alkali metal. It is expected that by employing solvents having high boiling points in the galvanic cell reactor, higher operating temperatures, e.g., 100° C.–200° C., or higher can be employed and thereby reduce the prealkaliation time. The operating temperature should be below the boiling point of the solvent, moreover, this temperature should not be so high as to adversely affect the other components of the system. Preferred solvents for high temperature applications include, for example, propylene carbonate, γ-butyrolactone, ethylene carbonate, diethyl carbonate, diethyl ether, butylene carbonate, 3-methylsulfolane, sulfolane, triglyme, tetraglyme and mixtures thereof, which are described in Dudley et al., *J. of Power Sources*, Vol. 35, pp. 59–82 (1991), which is incorporated herein.

Methods of fabricating electrochemical cells are known in the art. See, for example, U.S. Pat. Nos. 5,300,373, 5,316, 556, 5,346,385, 5,262,253, 4,472,487, 4,668,595, and 5,028, 500, all of which are incorporated herein. The following illustrates a method of how an electrolytic cell could be fabricated. Examples 1 and 2 describe the process of preparing the anode and cathode, respectively. With respect to the anode, following its formation on the current collector as described in Example 2, it is subject to pre-lithiation as described above. Example 3 describes the procedures for assembly a solid electrolytic cell.

The anode generally comprises an anode film that is laminated onto one or both sides of the current collector which is a thin metal foil or grid. Typically, each anode film is from about 100 μm to about 250 μm in thickness, preferably about 110 μm to about 200 μm, and more preferably about 125 μm to about 175 μm.

Similarly, the cathode of the present invention generally comprises a cathode film that is laminated onto one or both sides of the cathode current collector which is a thin metal foil or grid. Typically, each cathode film is from about 100 μm to about 200 μm in thickness, preferably about 130 μm to about 175 μm, and more preferably about 140 μm to about 165 μm.

Current collector for the anode and cathode can comprise, for example, a screen, grid, expanded metal, woven or non-woven or knitted wire fabric formed from an electron conductive material such as metals or alloys. Preferably, the current collector has a thickness from about 25 µm to about 75 µm, preferably about 35 µm to about 65 µm, and more preferably about 45 µm to about 55 µm. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

The anode current collector employed was a sheet of expanded copper metal that is about 50 µm thick. It is available under the designation 2Cu5-125 (flatten) from Delker Corp., Branford, Conn. The anode slurry was prepared as follows:

A polymer mixture comprising a copolymer of polyvinylidenedifluoride (PVDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, and 10.5 grams dibutyl phthalate. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M. M. M. Carbon, Willebrock, Belgium. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 µm thick. The aluminum grid is available under the designation 2AL5-077 from Delker Corp. The cathode slurry was prepared as follows:

A polymer mixture comprising a copolymer of polyvinylidenedifluoride (PVDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by mixing 28.9 grams of $LiMn_2O_4$, 2.4 grams of carbon black (Super P™) into a solution containing 60 grams acetone, and 8.7 grams dibutyl phthalate. The mixture was then vigorously mixed in the a high shear mixer until a substantially homogeneous blend was formed.

The cathode slurry was prepared by mixing the polymer mixture and the cathode mixture together under low shear conditions to form the cathode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $$\frac{M_n}{M_w} \cong 1.0$$

Next the dibutyl phthalate plasticizer is extracted from the precursor. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. The precursor is than pre-packaged in moistureimpermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed:

1. A method for fabricating an electrochemical cell which comprises the steps of:
   (a) preparing a carbon anode in a process comprising of:
      (i) providing a carbon material that is capable of intercalating lithium metal; and
      (ii) prelithiating the carbon material with lithium metal;
   (b) providing a cathode including cathodic material comprising a non-lithiated compound; and
   (c) forming a solvent-containing electrolyte that is interposed between said anode and said cathode.

2. The method according to claim 1 wherein after step (a) of preparing the carbon anode the method further comprises the step of removing some or essentially all intercalated lithium metal from the carbon material.

3. The method according to claim 1 wherein step (a) produces lithiated carbon in the anode.

4. The method according to claim 3 wherein the cathodic material consists essentially of a non-lithiated compound.

5. The method according to claim 1 wherein the prelithiation step comprises:
   positioning a prelithiation electrolyte between the carbon material and the lithium metal; and
   electrically connecting the carbon material to the lithium metal.

6. The method according to claim 1 wherein the prelithiation step comprises polarizing the carbon material in a galvanic cell.

7. The method according to claim 1 wherein preliathiation step comprises short circuiting the carbon material to a lithium counter electrode.

8. The method according to claim 1 wherein the non-lithiated cathodic material is selected from the group consisting of $V_6O_{13}$, $TiS_2$, $V_2O_5$, $\beta V_2O_5$, $TiO_2$, $MO_2$, $MoS_2$, $FeOCl$, $MoO_3$, and mixtures thereof.

9. The method according to claim 5 wherein the prelithiation step comprises of polarizing the carbon material in a galvanic cell.

10. The method according to claim 9 wherein the non-lithiated cathodic material is selected from the group consisting of $V_6O_{13}$, $TiS_2$, $V_2O_5$, $\beta V_2O_5$, $TiO_2$, $MO_2$, $MoS_2$, $FeOCl$, $MoO_3$ and mixtures thereof.

11. The method according to claim 5 wherein the prelithiation step comprises of maintaining a constant potential between the carbon material and lithium metal.

12. The method according to claim 11 wherein the non-lithiated cathodic material is selected from the group consisting of $V_6O_{13}$, $TiS_2$, $V_2O_5$, $\beta V_2O_5$, $TiO_2$, $MO_2$, $MoS_2$, $FeOCl$, $MoO_3$ and mixtures thereof.

13. The method according to claim 1 wherein the solvent-containing electrolyte comprises a polymeric matrix.

14. The method according to claim 1, wherein the prelithiation step causes a portion of the carbon material to undergo an irreversible reaction with the lithium metal.

15. The method according to claim 1, wherein the prelithiation occurs at a temperature greater than about 50° C.

16. The method according to claim 1, wherein the prelithiation occurs at a temperature range of 100° C. to 200° C.

17. An electrochemical cell fabricated by a process comprising the steps of:
   (a) preparing a carbon anode in a process comprising of:
      (i) providing a carbon material that is capable of intercalating lithium metal; and
      (ii) prelithiating said carbon material with lithium metal;
   (b) providing a cathode that comprises a non-lithiated compound; and
   (c) forming a solvent-containing electrolyte that is interposed between said anode and said cathode.

18. The electrochemical cell according to claim 17 wherein the process of fabricating the cell, after step (a) of preparing the carbon anode, further comprises the step of removing some or essentially all intercalated lithium metal from the carbon material.

19. The electrochemical cell according to claim 17 wherein step (a) produces lithiated carbon in the anode.

20. The electrochemical cell according to claim 19 wherein the cathodic material consists essentially of a non-lithiated compound.

21. The electrochemical cell according to claim 17 wherein the prelithiation step comprises:
   positioning a prelithiation electrolyte between the carbon material and the lithium metal; and
   electrically connecting the carbon material to the lithium metal.

22. The electrochemical cell according to claim 17 wherein the prelithiation step comprises of polarizing the carbon material in a galvanic cell.

23. The method according to claim 17 wherein preliathiation step comprises short circuiting the carbon material to a lithium counter electrode.

24. The electrochemical cell according to claim 17 wherein the non-lithiated cathodic material is selected from the group consisting of $V_6O_{13}$, $TiS_2$, $V_2O_5$, $\beta V_2O_5$, $TiO_2$, $MO_2$, $MoS_2$, $FeOCl$, $MoO_3$ and mixtures thereof.

25. The electrochemical cell according to claim 21 wherein the prelithiation step comprises polarizing the carbon material in a galvanic cell.

26. The electrochemical cell according to claim 25 wherein the non-lithiated cathodic material is selected from the group consisting of $V_6O_{13}$, $TiS_2$, $V_2O_5$, $\beta V_2O_5$, $TiO_2$, $MO_2$, $MoS_2$, $FeOCl$, $MoO_3$ and mixtures thereof.

27. The electrochemical cell according to claim 21 wherein the prelithiation step comprises of maintaining a constant potential between the carbon material and lithium metal.

28. The electrochemical cell according to claim 27 wherein the non-lithiated cathodic material is selected from the group consisting of $V_6O_{13}$, $TiS_2$, $V_2O_5$, $\beta V_2O_5$, $TiO_2$, $MO_2$, $MoS_2$, $FeOCl$, $MoO_3$ and mixtures thereof.

29. The electrochemical cell according to claim 17 wherein the solvent-containing electrolyte comprises a polymeric matrix.

30. The electrochemical cell according to claim 17, wherein the prelithiation step causes a portion of the carbon material to undergo an irreversible reaction with the lithium metal.

31. The method according to claim 17, wherein the prelithiation occurs at a temperature greater than about 50 C.

32. The method according to claim 17, wherein the prelithiation occurs at a temperature range of 100° C. to 200° C.

* * * * *